(12) United States Patent
Miller et al.

(10) Patent No.: US 9,493,957 B2
(45) Date of Patent: Nov. 15, 2016

(54) CATWALK FOR A GRAIN BIN OR THE LIKE AND A PLANK USED IN THE CONSTRUCTION THEREOF

(71) Applicant: The GSI Group, LLC, Assumption, IL (US)

(72) Inventors: Paul Kent Miller, Vandalia, IL (US); Chirag Chandrakant Patel, Simpsonville, SC (US); Arron Justin Cochran, Chatham, IL (US); Robb Glenn Williams, Taylorville, IL (US); Satheesh Kumar Somu, Taylorville, IL (US)

(73) Assignee: The GSI Group LLC, Assumption, IL (US)

( * ) Notice: Subject to any disclaimer, the term of this patent is extended or adjusted under 35 U.S.C. 154(b) by 109 days.

(21) Appl. No.: 13/659,320

(22) Filed: Oct. 24, 2012

(65) Prior Publication Data

US 2013/0098709 A1  Apr. 25, 2013

Related U.S. Application Data

(60) Provisional application No. 61/550,676, filed on Oct. 24, 2011.

(51) Int. Cl.
*E04G 7/00* (2006.01)
*E04G 3/24* (2006.01)
(Continued)

(52) U.S. Cl.
CPC .............. *E04G 3/243* (2013.01); *E04D 13/12* (2013.01); *E04F 11/00* (2013.01); *E04H 7/22* (2013.01); *Y10T 29/49826* (2015.01)

(58) Field of Classification Search
CPC ...... E04H 7/22; E04H 7/165; E04F 11/0226; E04F 2011/007; E04F 2011/005; E04F 2011/002; E04D 13/12; E04G 1/152; E04G 5/08; E04G 3/243; E04G 3/246; E04G 3/20; E04G 3/24; E04C 2/08

USPC ......... 182/222, 223, 128, 187, 131, 188, 87; 249/17; 14/73; 105/457; 108/57.3, 139, 108/66; 52/187, 650.3, 649.3, 82; 428/578
See application file for complete search history.

(56) References Cited

U.S. PATENT DOCUMENTS 737,377 A * 8/1903 England .................... E04G 3/24
                                                              182/128
839,846 A * 1/1907 Holden ................. E04F 11/032
                                                              52/187
(Continued)

FOREIGN PATENT DOCUMENTS

JP        2007138604 A    6/2007
KR      20030034728 A    5/2003

OTHER PUBLICATIONS

Definition of 'ring' found in action The American Heritage® Dictionary of the English Language, Fourth Edition copyright © 2000 by Houghton Mifflin Company. Updated in 2009. Published by Houghton Mifflin Company. All rights reserved.*

(Continued)

*Primary Examiner* — Daniel Cahn

(57) ABSTRACT

A plank (10) used to construct a platform such as a catwalk (C3, C4) extending about the exterior or interior of a building (B) includes first and second generally horizontal sections (12, 22). The second generally horizontal section of the plank extends from one side of the first section. During construction of the platform, the first section of one plank overlaps the second section of an adjacent plank. A third generally vertical section (52) of the plank extends generally perpendicularly from one side of the second section and includes lips (58, 60) at its inner and outer ends for attaching the plank to toe boards (40, 44) to secure the plank to the frames. When installed, the planks extend from a side of the building. The resulting catwalk extends either in a straight line, or is curved, depending upon the amount of overlap the first and second sections of the respective planks.

9 Claims, 7 Drawing Sheets

(51) Int. Cl.
*E04F 11/00* (2006.01)
*E04D 13/12* (2006.01)
*E04H 7/22* (2006.01)

(56) References Cited

U.S. PATENT DOCUMENTS

| | | | | |
|---|---|---|---|---|
| 1,197,999 | A * | 9/1916 | Beckett | 182/187 |
| 3,250,345 | A * | 5/1966 | Behr | C21O 5/44 |
| | | | | 182/113 |
| 3,464,067 | A * | 9/1969 | Hauck | E04H 4/141 |
| | | | | 4/506 |
| 3,908,793 | A * | 9/1975 | Vaughn et al. | 182/82 |
| 4,082,161 | A * | 4/1978 | Johnson | 182/82 |
| 4,118,816 | A * | 10/1978 | Mittag | E01D 15/133 |
| | | | | 14/69.5 |
| 4,419,851 | A * | 12/1983 | Kruger | E04F 11/18 |
| | | | | 52/184 |
| 4,527,366 | A * | 7/1985 | Greene | E04F 11/025 |
| | | | | 182/83 |
| 4,587,893 | A * | 5/1986 | Brockhaus | E04H 7/22 |
| | | | | 454/182 |
| 4,694,933 | A | 9/1987 | Sinko | |
| 4,727,959 | A | 3/1988 | Kummer | |
| 4,919,230 | A * | 4/1990 | Langer et al. | 182/186.8 |
| 6,856,664 | B2 * | 2/2005 | Pence et al. | 376/260 |
| 7,469,516 | B2 * | 12/2008 | Smith | E04F 11/035 |
| | | | | 52/182 |
| 8,272,479 | B1 * | 9/2012 | Leach | 182/187 |
| 8,434,273 | B1 * | 5/2013 | Greene | E04H 7/065 |
| | | | | 52/182 |
| 8,595,989 | B1 * | 12/2013 | Greene | E04H 7/065 |
| | | | | 52/182 |
| 8,595,990 | B1 * | 12/2013 | Greene | E04H 7/065 |
| | | | | 52/182 |
| 2008/0302605 | A1 * | 12/2008 | St-Germain et al. | 182/223 |
| 2009/0095569 | A1 * | 4/2009 | Cooper | A01M 31/02 |
| | | | | 182/187 |
| 2010/0224447 | A1 * | 9/2010 | Rogers | 182/222 |
| 2014/0348619 | A1 * | 11/2014 | Granger | B65B 23/00 |
| | | | | 414/399 |

OTHER PUBLICATIONS

International Search Report from corresponding International Application No. PCT/US2012/061606 mailed Jan. 31, 2013.
Written Opinion of the International Searching Authority from corresponding International Application No. PCT/US2012/061606 mailed Jan. 31, 2013.

* cited by examiner

CATWALK FOR A GRAIN BIN OR THE LIKE AND A PLANK USED IN THE CONSTRUCTION THEREOF

CROSS REFERENCE TO RELATED APPLICATIONS

This application claims priority to U.S. App. No. 61/550,676 filed Oct. 24, 2011, and which is incorporated herein by reference.

STATEMENT REGARDING FEDERALLY SPONSORED RESEARCH OR DEVELOPMENT

Not Applicable

BACKGROUND OF THE INVENTION

This invention relates to grain bins, tower dryers, and similar structures having platforms which extend about either the exterior or interior of the structure, or both; and, more particularly, to a catwalk type platform in which the segments forming the catwalk extend radially (inwardly or outwardly) from the side of the structure rather than circumferentially about the structure.

Grain bins, tower dryers, and similar structures are relatively tall buildings having a generally curved sidewall. Access to the structure is typically available at one of several levels extending from the base of the structure to its top. To help people move around the building, platforms commonly referred to as "catwalks" are constructed at each level where access is required. To reach a catwalk, the person climbs a ladder extending from the ground to a top level of the structure, with each intermediate catwalk being accessible to one climbing up or down the ladder. It is known to those skilled in the art that many of these structures have catwalks installed on the inside of the bin or tower, as well as catwalks extending about the outside of the structure.

Catwalks have heretofore been constructed using planks which extend circumferentially about the inside or outside of the building's sidewall. A typical interior catwalk construction is shown in FIG. 1. With respect to FIG. 1, the planks used to form the catwalk are of different lengths. In FIG. 1, a catwalk C1 extending around the interior of a building (not shown) is comprised of three rows of metal planks P1-P3. The planks used for each row are of a different length. That is, the innermost row of planks P1 (the row of planks adjacent the curved outer wall of the structure, is of a first length, the planks P2 forming the second row are of a second and greater length, and the planks P3 forming the outermost row are of an even greater length. Accordingly, to fabricate catwalk C1, one has to have available at least three different size planks.

It will be understood that grain bins, dryers, and similar buildings are not uniform in construction, but may be of different sizes. This means that the manufacture of catwalks for different size structures may require planks of different sizes from the planks P1-P3 shown in FIG. 1. Accordingly, a large number of different size planks must be kept in inventory so to accommodate all the needs of a platform fabricator. Further, as shown in FIG. 2, a catwalk C2 is erected about the exterior of the building. As with catwalk C1, catwalk C2 has three rows of planks P4-P6, the lengths of these planks differing from those of planks P1-P3. Therefore, constructing catwalks on the exterior and interior of the same building requires an even greater number of different size planks which further impacts not only cost, but also ease of construction.

In addition to these issues, manufacturing catwalks using circumferentially extending planks results in an unevenness in the space between the curved outer or inner wall of the building and the planks adjacent the wall. As shown in FIG. 3, the distance D between the side S of the building B and the inner edge of the inner row of planks forming a catwalk varies significantly as one moves around the side of the building. This problem becomes more pronounced for small diameter buildings and creates both a safety issue and a worker effectiveness issue. In the former instance, a relatively large space between the building sidewall and catwalk increases the probability that a tool, for example, can fall from one level to another and injure people working on a lower level, or damage equipment on the lower level. Workers are affected because the gap may mean they cannot put tools or other objects close to the wall or get as close to the wall as they would like to be in order to perform some function (e.g., maintenance). FIG. 3 shows an external catwalk. However, it will be apparent that the same issues are raised with the internal catwalk of FIG. 1.

BRIEF SUMMARY OF THE INVENTION

The present disclosure is directed to platforms such as catwalks erected about the exterior and/or interior of a building and a plank used for the construction of such platforms. The planks used in the fabrication of a catwalk, whether exterior or interior, are of a uniform size and shape so to eliminate the need for the various size planks previously used in such constructions. In accordance with an aspect of the invention, only one size plank is needed to construct a catwalk.

Inventory, fabrication, and assembly costs are significantly reduced since only one size plank is required. Use of a single size plank eliminates having to stockpile different size planks at a worksite and then having to locate particular size planks as the catwalk is formed. Also, single size planks are more readily assembled offsite for delivery to the site for installation.

Each plank used to fabricate a platform includes a first generally horizontal section having a relatively flat surface. A second generally horizontal section of the plank also has a relatively flat surface and extends from one side or edge of the first section. The first section of one plank overlaps and is attached to the second section of an adjacent plank to construct the platform. A third, generally vertical section of the plank extends perpendicularly from one side or edge of the second section and has inner and outer lip ends for attaching the plank to respective inner and outer rings of toe boards so to secure the plank in place. When installed, the planks overlap and "fan out" generally-radially from the side of the building, inwardly or outwardly, rather than extend circumferentially about it as do catwalks made using the conventional planks of different sizes. This construction not only makes it easier to match the contour of a catwalk to the overall shape of a bin or dryer, but also eliminates the need for handrails adjacent to the building since there is now a smaller hazard area D between the inner end of the catwalk and the side S of the building. In addition, tubular handrails having no disruptions can now be used for walking along the catwalk.

The planks are of a heavy duty metal construction and can be used to fabricate straight or multi-curved walkways or platforms, as well as circular catwalks.

In accordance with one aspect, a catwalk extending around the exterior or interior of a building comprises—a plurality of planks installed side-by-side circumferentially about a sidewall of the building. Each plank has an inner end, an outer end, a first generally horizontal section and a second generally horizontal section. The first and second horizontal sections each have a first inner end and a second outer end and a first side and a second side, with the second horizontal section extending from the second side of the first horizontal section such that the first side of the first horizontal section defines a first side of the plank and the second side of the second horizontal section defines a second side of the plank. In the catwalk, the first horizontal section of one plank overlaps the second horizontal section of an adjacent plank. Further, the catwalk either extends in a relatively straight line, or is curved, as a function of the amount of overlap between the first and second horizontal sections of the respective planks.

The catwalk further includes toe boards to which the inner and outer ends of each plank are attached so to secure the plank in place. The planks, when installed, fan out from the side of the building and extending extend radially, outwardly or inwardly, from the wall of the building.

In accordance with an aspect of the plank, the outer edge of the first section of the plank is wider than an inner edge thereof, such that the circumference of the catwalk can be greater around its outer periphery than its inner periphery. Similarly, the outer edge of the second section of the plank is wider than an inner edge thereof.

In accordance with an aspect of the plank, the plank includes a third generally vertical section extending perpendicularly from a longitudinal side of the second horizontal section. The third vertical section has a lip at its respective inner and outer ends; and the plank is secured to the toe board via the lip. The third vertical section of the plank extends from the second side of the second horizontal section of the plank, and the respective lips of the third vertical section extend generally perpendicular to the inner and outer ends of the third vertical section.

In accordance with an aspect of the catwalk, the catwalk can include an opening formed therein to accommodate a ladder which then provides access to the catwalk. The ladder is secured to one of the toe boards to hold the ladder in place.

In accordance with an aspect of the plank, the second section of each plank has at least a pair of spaced slots and the first section of each plank has a series of correspondingly spaced openings formed adjacent the opposite side of the first section from the side from which the second section of the plank extends. The openings in the first section of one plank overlay the corresponding slots in the second section of an adjacent plank when the catwalk is formed, and fasteners can then be inserted through the holes in the one plank and the slots in the adjacent plank to secure the planks together. In an illustrative embodiment, the holes of the first section define slots, and the slots of the first section are angled relative to the slots of the second section, such that the slots of one section cross over the slots of the other section. The slots of one of the first and second sections can extend generally perpendicular to a longitudinal axis of the section.

In accordance with another aspect of the plank, the second section is vertically offset from, but generally parallel to the first section. The second section can be spaced below the first section by a distance approximately equal to the thickness of the first section, such that the first sections of the planks of the catwalk will be generally planar.

In accordance with another aspect of the plank, the plank comprises (1) a first section comprising opposed first and second ends, opposed first and second sides, and at least a pair of spaced apart attachment openings proximate the first side; and (2) a second section comprising opposed first and second ends, opposed first and second sides, and at least a pair of spaced apart attachment openings proximate the second side of the second section; with the second section extending from the second side of the first section, and the second section being vertically offset from, but generally parallel to, the first section, such that the first section of one plank and the second section of an adjacent plank overlap each other in a platform assembled from the planks. The attachment openings of the first and second sections are positioned such that the attachment openings of the first section of a first plank are aligned with the attachment openings of the second section of an adjacent plank when planks are assembled into a platform; at least one of the attachment openings of the first section and second section defining a slot; the slot not being parallel to a transverse axis of the section in which the slot is formed. Both the first section and second section attachment openings can define slots; the slots of the first and second section being oriented such that the slots of the first and second section of adjacent planks cross each other when planks are formed into a platform. The attachment slots of one of the first section and second section can be generally perpendicular to the transverse axis of the section in which they are formed. Further, the attachment slots of the first section and second section can be generally perpendicular to each other.

In accordance with an aspect of this plank, the plank can include a third vertical section extending generally perpendicularly from the second side of the second horizontal section, the third vertical section having a lip at respective first and second ends thereof and the lips of the third vertical section of the plank can have openings sized and shaped to secure the inner and outer toe boards to the plank.

Lastly, a method of constructing a catwalk made from the planks comprises installing a plurality of planks side-by-side circumferentially about a sidewall of the building, with the planks extending generally radially from the building. When the planks are positioned, the first section of one plank overlaps the second section of an adjacent plank. The planks are secured together in this overlapping position.

The method can further include forming a first set of toe boards into a first ring extending about the side of the building substantially adjacent thereto; forming a second set of toe boards into a second ring extending about the side of the building and spaced from the first ring, with the annular spacing between the first and second rings corresponding to the length of the planks; and, securing a first end of the planks to the toe boards of the first ring and securing a second end of the planks to the toe boards of the second ring.

In accordance with an aspect of the method, each plank further includes a third generally vertical section extending perpendicularly from a side of the second section of the plank. The third section has a lip at its respective inner and outer ends for attaching the plank to a respective toe board of the first and second rings.

In accordance with a further aspect of the method, the amount of overlap of the first section of the one plank with the second section of the adjacent plank is a function of the diameter of the building about which the catwalk is constructed.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

Figure 1:
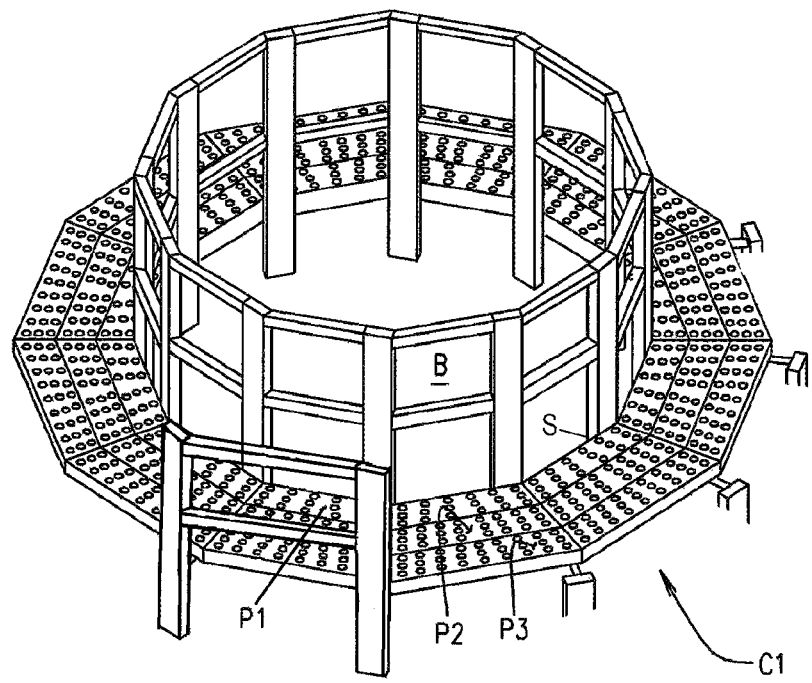
FIG. 1 is a perspective view of a building frame and a prior art catwalk construction about the inside of the building.
Figure 2:
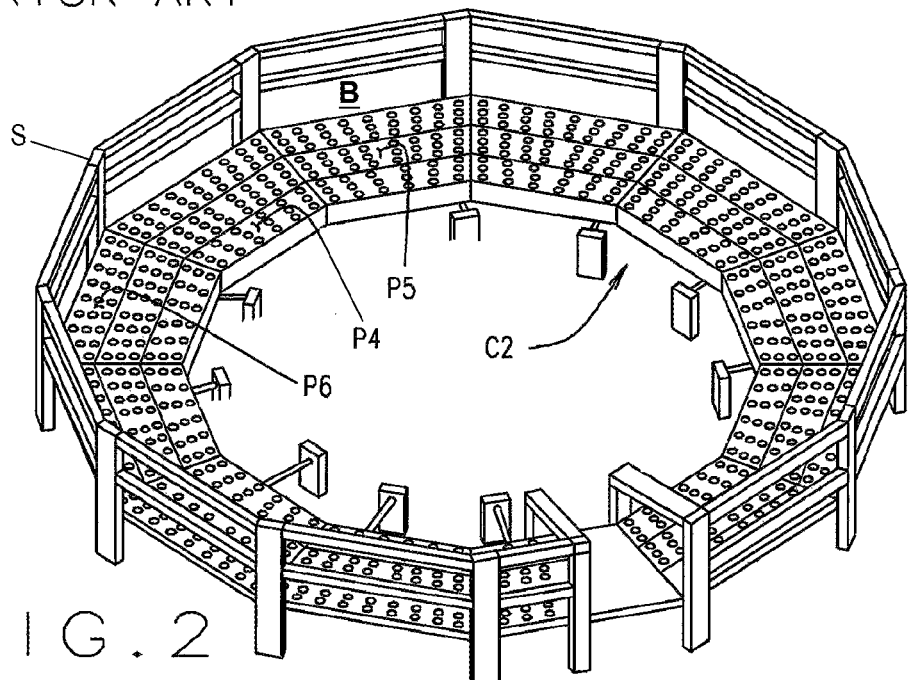
FIG. 2 is a perspective view similar to FIG. 1 with a prior art catwalk construction about the outside of the building.

The following detailed description illustrates the claimed invention by way of example and not by way of limitation. This description clearly enables one skilled in the art to make and use the claimed invention, and describes several embodiments, adaptations, variations, alternatives and uses of the claimed invention, including what is presently believed to be the best mode of carrying out the claimed invention. Additionally, it is to be understood that the claimed invention is not limited in its application to the details of construction and the arrangement of components set forth in the following description or illustrated in the drawings. The claimed invention is capable of other embodiments and of being practiced or carried out in various ways. Also, it will be understood that the phraseology and terminology used herein is for the purpose of description and should not be regarded as limiting.

Figure 3:
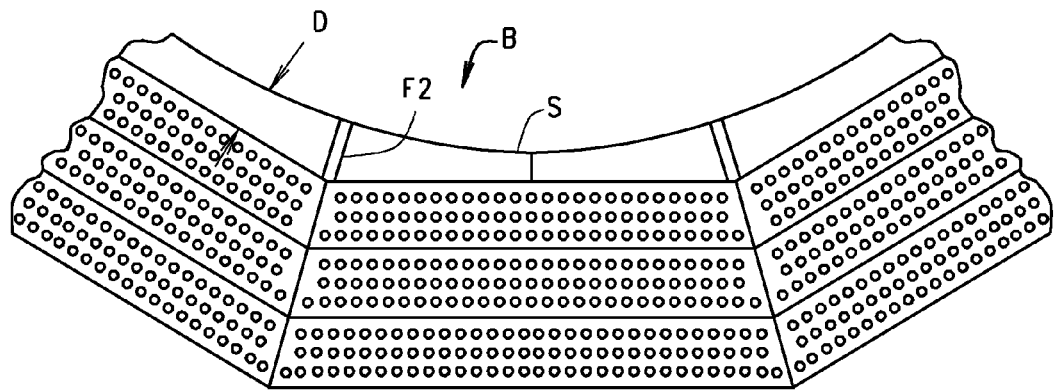
FIG. 3 illustrates the distance between a sidewall of a building and the inner edge of planks used in a prior art catwalk construction.
Figure 4:
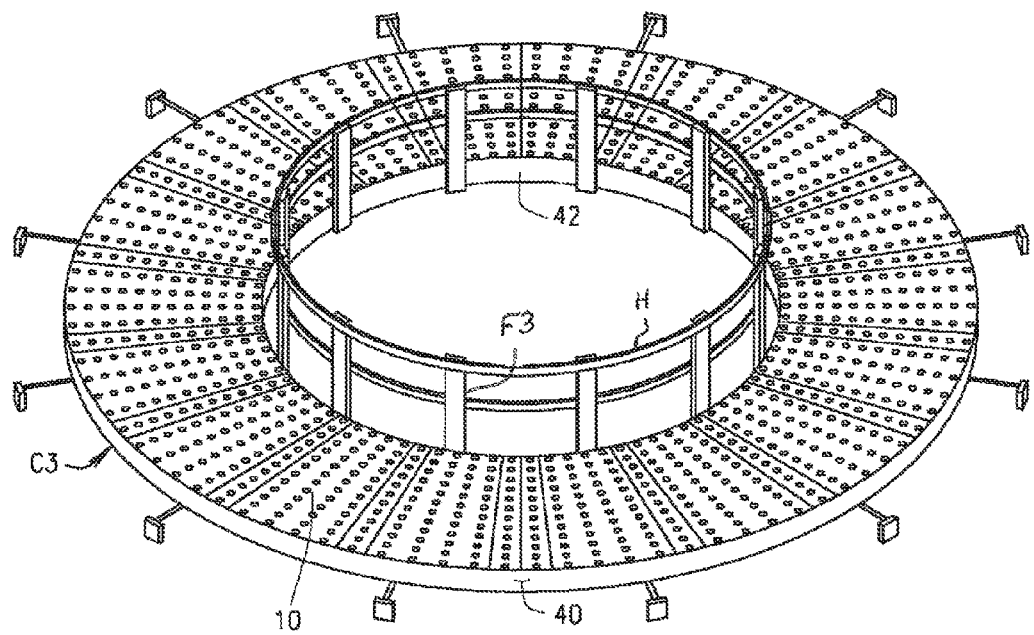
FIG. 4 is a perspective view of a catwalk construction of the present invention for a catwalk extending about the inside of a building.
Figure 5:
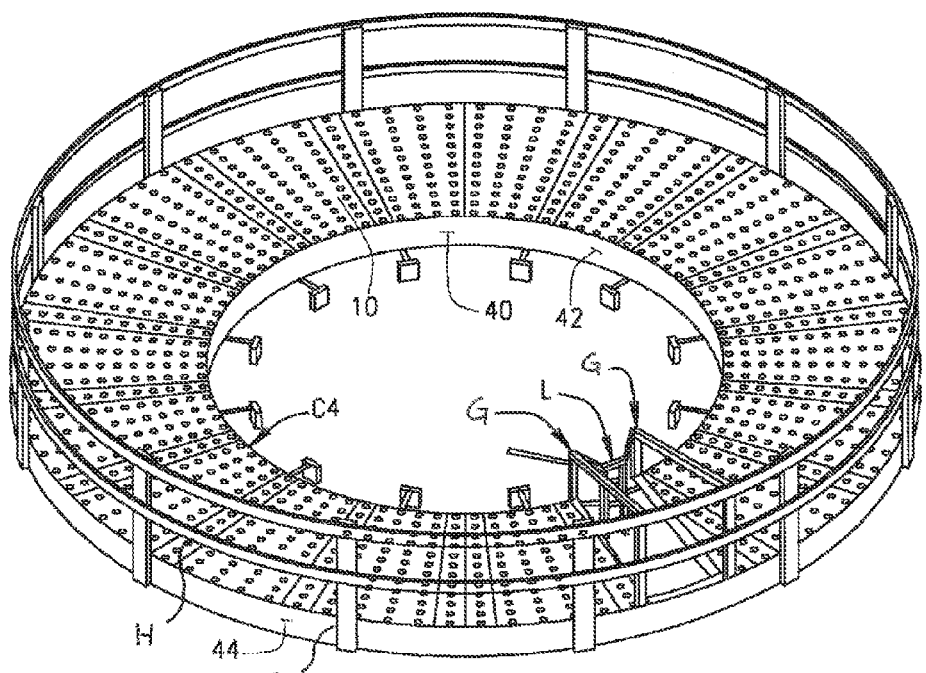
FIG. 5 is a perspective view of a catwalk construction of the present invention for a catwalk extending about the outside of a building.
Figure 9:
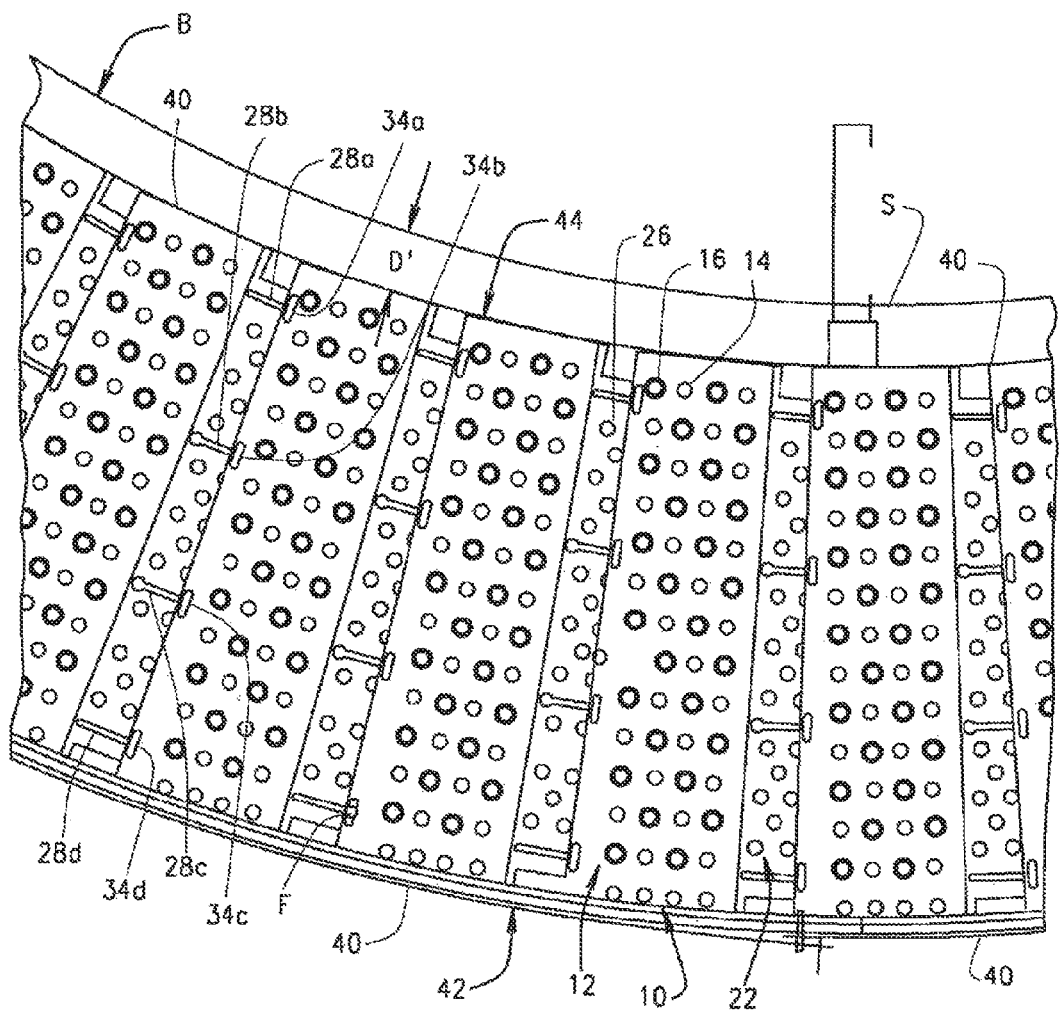
FIG. 9 is a plan view of a portion of a catwalk illustrating the compactness of the construction using the planks.

Referring to the drawings, a catwalk C3 is shown in FIG. 4 to extend circumferentially about the interior of a sidewall of a building; while in FIG. 5, a catwalk C4 extends circumferentially about the exterior of the sidewall of the building. In accordance with the invention, planks 10 which are of a uniform size and shape are used to construct the platforms comprising these catwalks. The sidewall S of building B is illustrated in FIGS. 3 and 9. Those skilled in the art will understand that while the discussion which follows is directed to the fabrication of a circular catwalk, the planks 10 are also used to construct platforms of other shapes including straight platforms and multiple curved platforms all without departing from the scope of the invention.

In this regard, and as described hereafter, those skilled in the art will understand that the construction of a straight platform or a curved platform is dependent upon the amount of overlap between the first section of one plank with the second section of its adjacent plank, and the orientation of the two planks to each other (i.e., whether the planks are generally parallel or define an angle). Further, a catwalk or platform can have a straight section along one reach of the platform and then transition into a curved section. Additionally, the amount of curvature can be varied throughout the length of the platform by adjusting the amount and angle of overlap so that one reach of the platform has a greater degree of curvature than an adjacent section. Importantly, any variation from straight to curved, and from curved to more or less curved, is achieved using only the one type of plank 10. Planks of different sizes or curvature are not required resulting in substantial savings in inventory and construction time.

Figure 6A:
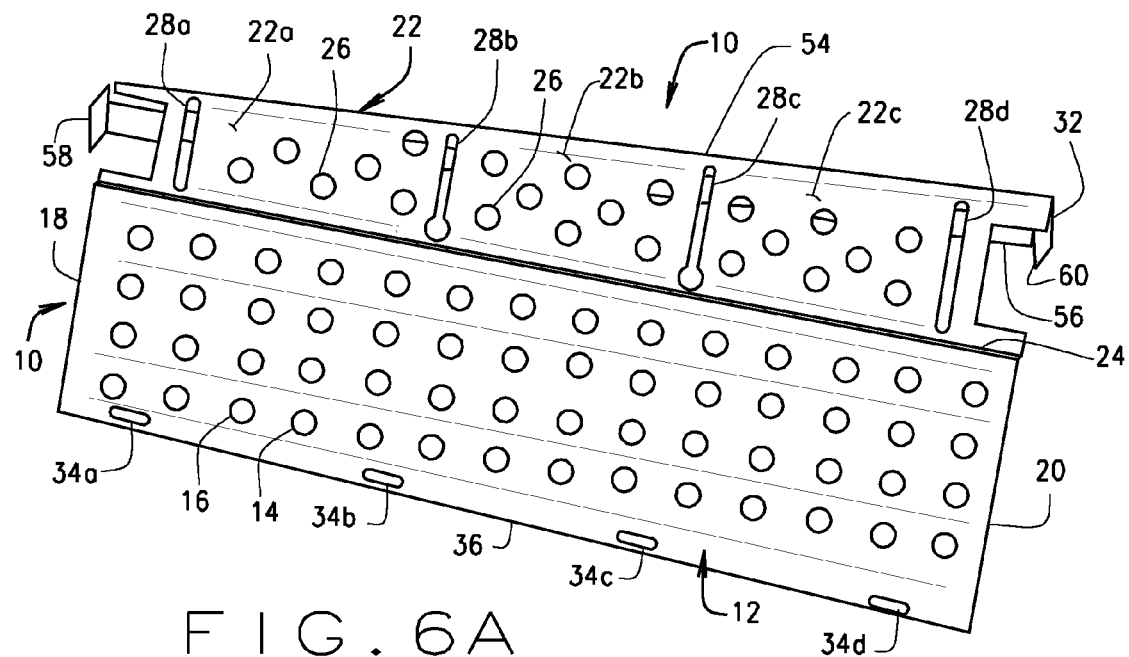
FIGS. 6a and 6b are top plan and top perspective views of a plank used in the construction of a catwalk of the present invention.
Figure 6B:
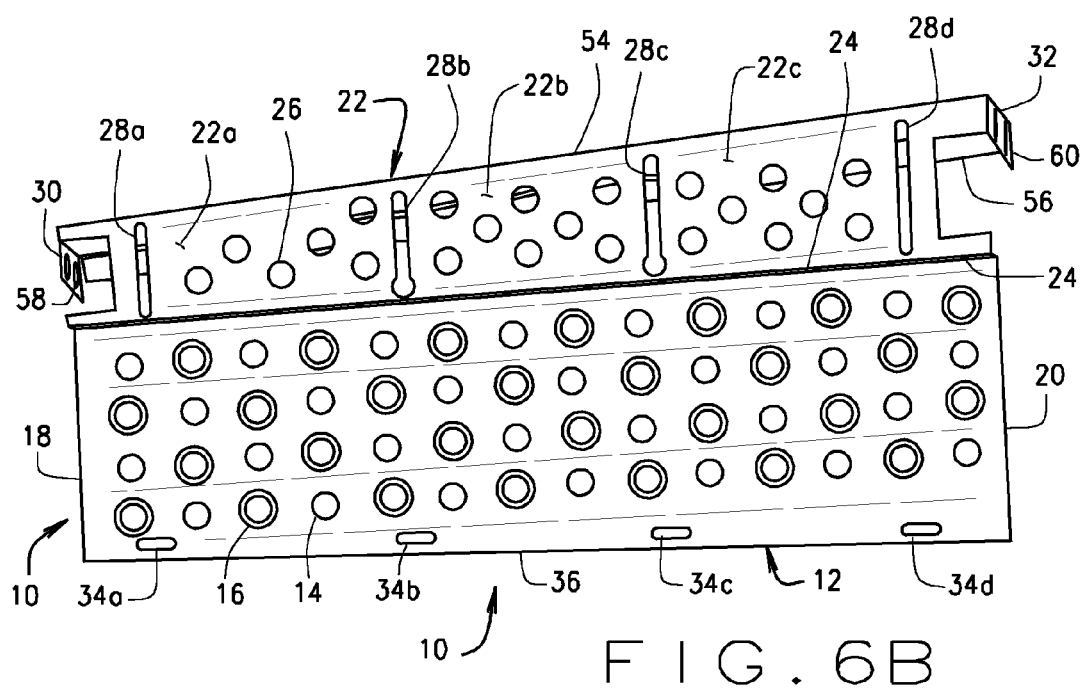

As shown in FIGS. 6-8 and 11, the plank 10, which is preferably a one-piece plank made of a heavy duty sheet metal construction, has a first generally horizontal section 12. The section 12 has a relatively flat surface in which are formed a series of openings 14 and 16. The openings 14 are flush with the upper surface of the sections; while, the openings 16 have raised edges. The openings are arranged in rows of four (as shown in FIG. 6) with the rows extending from an inner or first edge 18 of section 12 to an outer or second edge 20 thereof. There are two openings 14 and two openings 16 in each row with the positions of the openings alternating from one row to the next. As can be appreciated, the number of openings 14 and 16 in each row, and the shape of the openings can be altered, if desired. Additionally, the pattern defined by the openings 14 and 16 can be altered. That is, the openings do not need to be formed in rows, per se.

Next, the outer edge 20 of section 12 of plank 10 is wider than inner edge 18 of the section. Because of this, when a catwalk C3 or C4 is fabricated, the circumference of the catwalk will be greater around its outer periphery than around its inner periphery, this depending upon the amount of overlap and relative angle of the planks. This is as shown in FIGS. 4 and 5.

Figure 8:
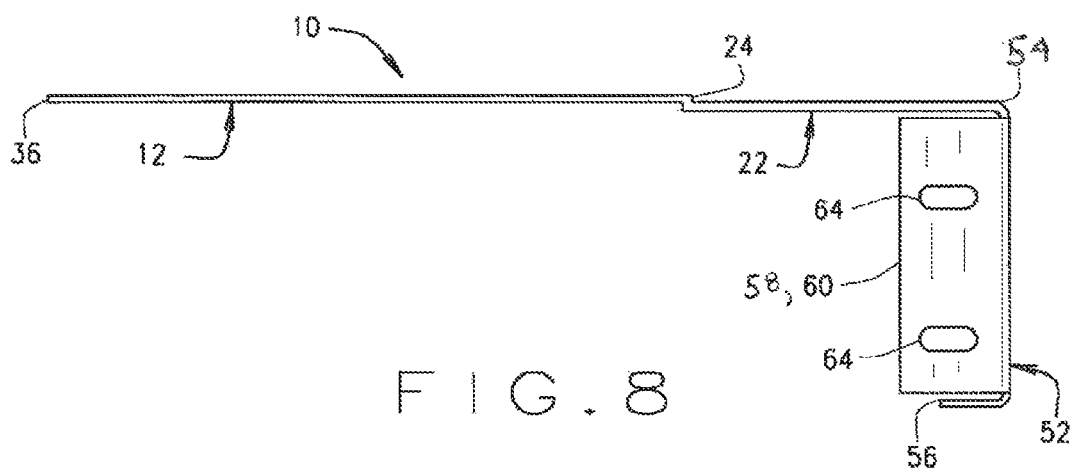
FIG. 8 is an end elevation view of the plank.

As best shown in FIG. 8, the plank 10 has a second generally horizontal section 22 which extends generally parallel to section 12 and projects outwardly from a first longitudinal side or edge 24 of section 12. Section 22 also has a second longitudinal side or edge 25, which as shown in FIG. 8, is a bend line between section 22 and a third or vertical section 52, as is more particularly described below. As best seen in FIG. 8, the second section 22 is connected to first section 12 along the first longitudinal side 24 of the first section, and is spaced below the first section 12 a distance approximately equal to the thickness of the first section. The section 22, like the section 12, has a relatively flat upper surface in which are formed openings 26 similar in size and shape to the openings 14 in section 12. Section 22 has four slots 28a-28d which extend transversely of the section (perpendicular to the longitudinal axis of this section) at spaced intervals between an inner edge 30 of section 22 and an outer edge 32 of the section. As with section 12, outer edge 32 of section 22 is wider than inner edge 30 of this section. As seen in FIG. 6A, the plank 10 is thus in the shape of a parallelogram or a truncated triangle. This again allows the circumference of catwalk C3 or C4 to be greater around its outer periphery than around its inner periphery.

The slots 28a-28d divide the plank section 22 into three sub-sections 22a-22c. Because the width of section 22 increases from its inner 30 to its outer edge 32, the arrangement of openings 26 in each sub-section 22a-22c differs from the arrangement in each of the other two sub-sections. Thus, while the spacing of these openings is generally uniform throughout the length of section 22, there are more openings 26 in sub-section 22b than in sub-section 22a, and more openings in sub-section 22c than in sub-section 22b.

Figure 10:
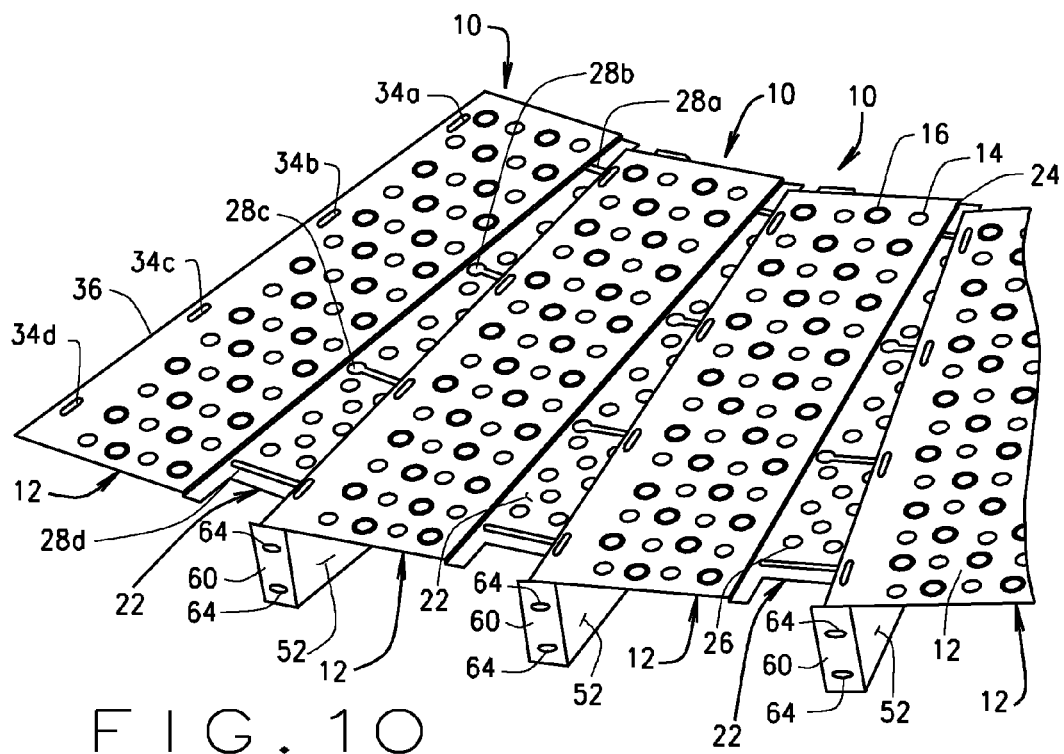
FIG. 10 is a perspective view of the portion of the catwalk.
Figure 11:
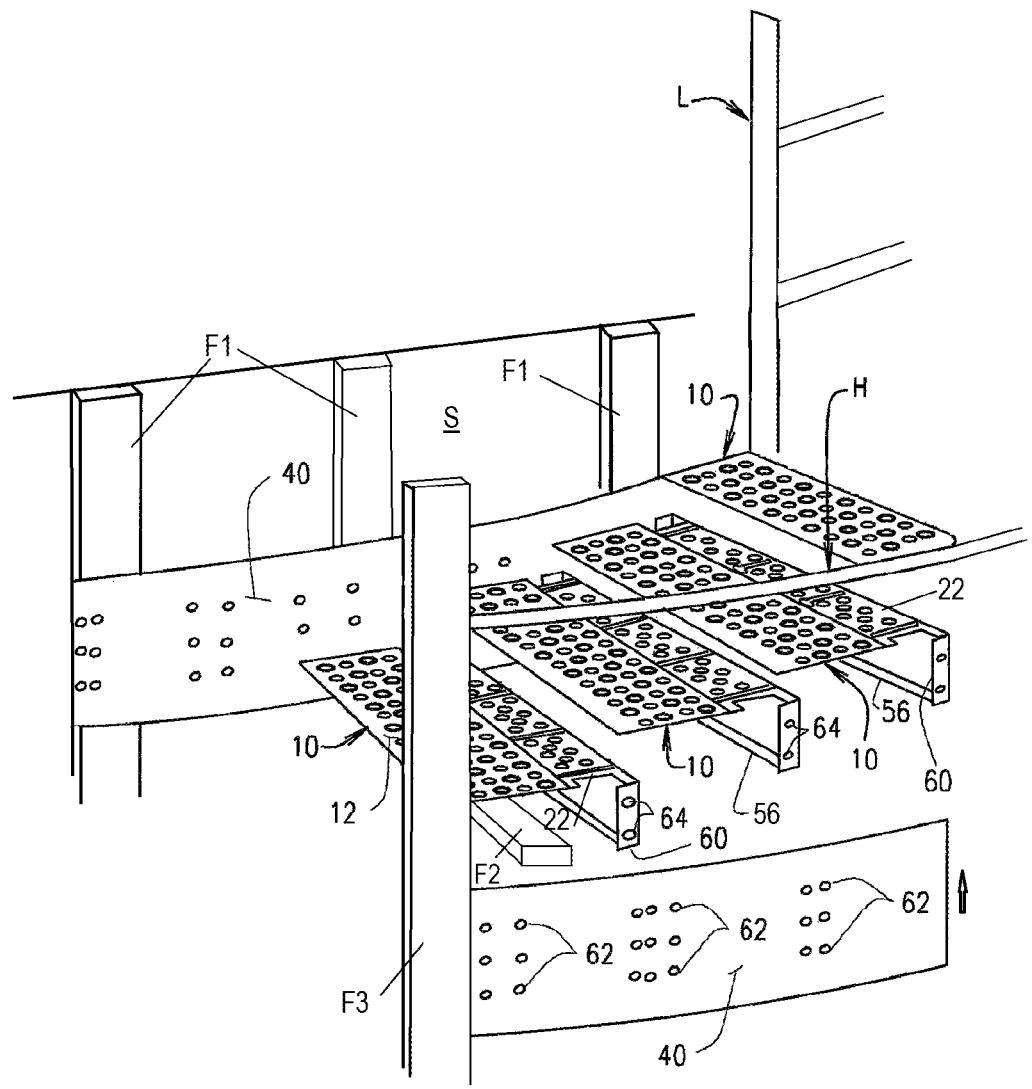
FIG. 11 is an exploded view of the portion of the catwalk illustrating how the planks are connected together and with the building frame to construct the catwalk.

As particularly shown in FIGS. 9-11, during fabrication of catwalk C3 or C4, the first section 12 of one plank 10 overlaps the second section 22 of an adjacent plank 10 to construct the platform. Because the second section 22 is offset vertically from the first section 12 a distance approximately equal to the thickness of the first section, the first sections 12 of adjacent planks 10 will be substantially co-planar. As discussed above, the second section 22 of each plank 10 has a series of spaced slots 28a-28d extending perpendicular to the longitudinal axis of the section. The first section 12 of each plank has a series of correspondingly spaced openings 34a-34d formed adjacent a second longitudinal side 36 of the first section 12 which is opposite to the first longitudinal side 24 of section 12. The openings 34a-34d comprise slots extending parallel to and adjacent side 36 of section 12. When the section 12 of one plank 10 is placed over section 22 of the adjacent plank, the slots 34a-34d formed in section 12 of the one plank respectively overlay the corresponding slots 28a-28d in second horizontal section 22 of the adjacent plank. The size of the respective slots 28a-28d and 34a-34d allow the two planks to be adjusted relative to one another until they are properly placed. The slots 28a-d and slots 34a-d are oriented generally perpendicularly to each other. Hence, the slots 34a-d of one plank cross over the slots 28a-d of the adjacent plank. Fasteners F (see FIG. 9) are inserted through the two sets of slots to lock the planks together and in place. The crossing over of the slots allows for the angular orientation of the two planks relative to each other to be adjusted prior to fastening the two planks together. The orientation of the slots could be reversed. That is, the slots 34a-d could be generally perpendicular to the longitudinal axis of the first section 12 and the slots 28a-d could be generally parallel to the longitudinal axis of the second section 22. Further, what is important is that the first section slots 34a-d and the second section slots 28a-b be angled relative to each other. Preferably, the slots would still define 90° angles relative to each other. Thus, each of the slots could be angled relative to the edges of the first and second sections, and still allow for the setting of the desired overlap and angle between two adjacent planks.

In addition to the planks 10, construction of catwalk C3 or C4 further includes use of inner and outer toe boards 40 (FIGS. 9 and 11). The toe boards 40 comprise rectangular plates used to form an inner ring indicated generally 42 (FIG. 5) and to which the inner end of each plank 10 is attached, and an outer ring indicated generally 44 in the drawings to which the outer end of each plank is attached. In constructing a catwalk C4 extending about the outside of the building B as shown in FIG. 5, vertical frame members are attached to the side of the building at spaced intervals about the circumference of the building and the toe boards 40 forming the inner ring are attached to these frame members. Conversely, when constructing a catwalk C3 extending from the inside of the building B as shown in FIG. 4, the toe boards 40 forming the outer ring 44 are attached to frame members attached to the side of the building.

Figure 7:
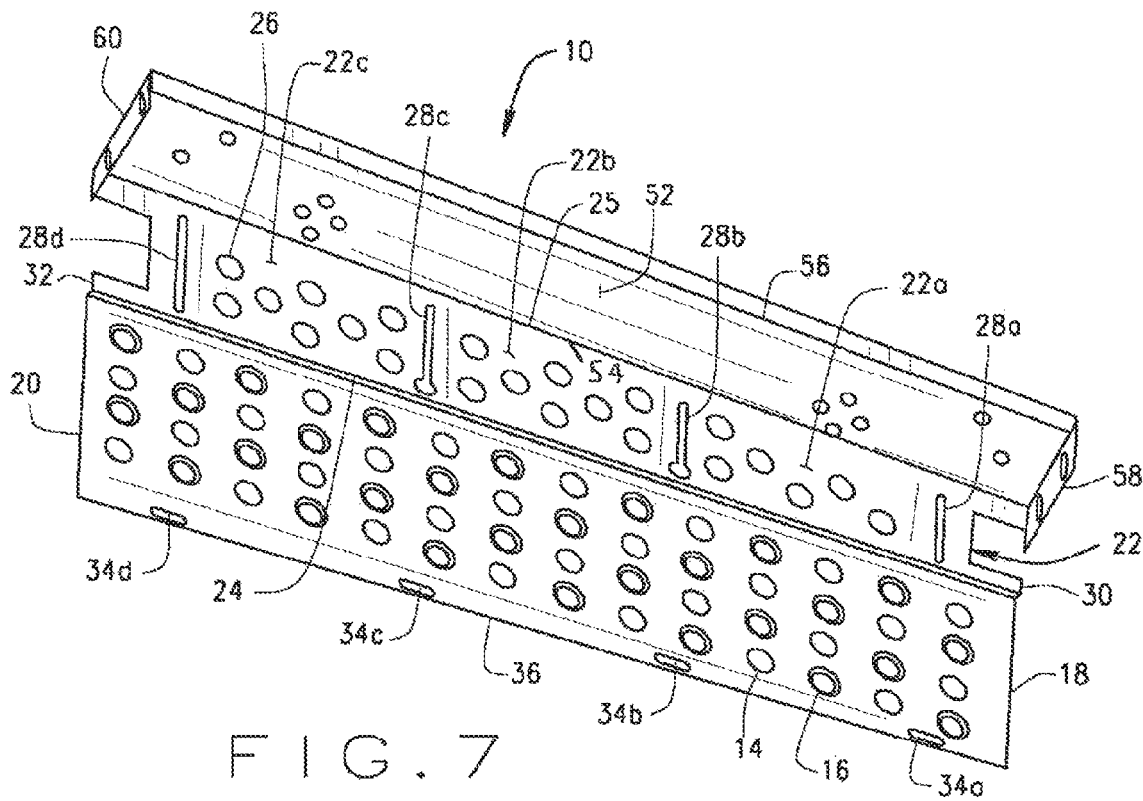
FIG. 7 is a bottom perspective view of the plank.

As best seen in FIGS. 7 and 8, plank 10 includes a third section 52 which is a generally vertical section that extends perpendicularly from an outer longitudinal side 54 of the second horizontal section 22 of the plank. At the distal end of section 52, the section 52 is bent inwardly to form a lower lip 56 which extends the length of the section 52, and lips 58, 60 at the respective inner and outer ends of the section 52 for attaching the plank to the inner and outer toe boards (40). Each lip 58, 60 is bent at a 90° angle to section 52 and extends partially across the inner and outer ends of each plank.

As shown in FIG. 11, the toe boards 40 have spaced sets of openings 62 formed therein. The lips 58, 60 in the third vertical section 52 of each plank 10 have correspondingly sized openings or slots 64 (FIG. 8) formed therein. Each lip 58, 60 has two horizontally extending slots 64; and when a plank is installed, each end of the plank is adjusted until the two slots 64 in the respective inner and outer lips is aligned with an opening 62 in the toe boards 40. Then, fasteners are inserted through the respective openings in the toe boards 40 and lips 58, 60 to securely attach each end of the plank to the respective inner and outer toe board rings.

When the installation is completed, the planks 10 extend radially outwardly or inwardly from the outside or the inside of building B. Importantly, the planks fan out or in from the side of the building and provide a uniform walkway about the structure. Now, the distance D' (FIG. 9) between the side of the building and the edge of the catwalk is substantially uniform around the circumference of the building as indicated in FIG. 9. Also, the distance D' is significantly less than the distance D of the prior art catwalks C1 or C2 which was achievable using planks of different sizes.

Those skilled in the art will understand that the amount and angle of overlap of the planks is a function of the diameter of the building about which the catwalk is constructed. That is, as the diameter of the building increases, there is less overlapping of planks than there is for buildings which are smaller in diameter. However, since grain bins, tower dryers, and similar structures are typically constructed within a certain range of building parameters (including its diameter), construction of a catwalk or similar platform can be achieved using only the one size plank 10 as described above.

Since access to a catwalk typically requires use of a ladder L (FIG. 5) extending up the side of the building, during construction of the catwalk, a space is often left for the person climbing the ladder to walk out onto the platform. As shown in FIG. 5, this can be done by leaving out a number of planks 10. Also, gates G can be provided next to the ladder to prevent someone from inadvertently falling through the opening provided for the ladder. The ability to easily form such openings in the catwalk platform facilitates construction of the catwalk system. Also during construction, a number of planks 10 can be left out of the assembly to accommodate jacks (not shown) used to lift a dryer (also not shown) as it is being assembled. Using cage nuts (not shown), a dryer assembly can be completed from above without a worker having to lean over a catwalk to complete the assembly when the dryer is above the jacks. This enhances worker safety.

Finally, because the distance D' between the platform and the building is smaller than prior art catwalks, the catwalks C3 and C4 constructed using the planks 10 typically do not need a handrail adjacent the side of the building. And, a handrail H installed around the outside of the catwalk can readily use tubular members attached to frame members F3 extending vertically from the rings of the toe boards 40.

In view of the above, it will be seen that the several objects and advantages of the present disclosure have been achieved and other advantageous results have been obtained.

Having thus described the invention, what is claimed and desired to be secured by Letters Patent is:

1. A catwalk adapted to extend generally horizontally from either an interior or an exterior of a curved sidewall of a building, said catwalk comprising:
    a plurality of one-piece planks configured to extend generally radially with respect to said sidewall and configured to be adjacent one another when secured to said sidewall; each plank of said plurality of one-piece planks, when installed on said sidewall, having a proximal end and a distal end relative to said building, said proximal end being proximate to and said distal end being remote from said building, when said each plank of said catwalk is mounted to the building, said each plank of said plurality of planks further having a first generally horizontal section and a second generally horizontal section;
        wherein said first horizontal section of said each plank has a first end and a second end and a first side and a second side, and the second horizontal section of said each plank has a first end and a second end and a first side and a second side,
        wherein said second horizontal section of said each plank extending from the second side of said first horizontal section of said each plank respectively such that said first side of said first horizontal section defines a first side of said each plank and such that said second side of said second horizontal section defines a second side of said each plank;
        wherein when said plurality of planks is arranged such that a first one of said plurality of planks is adjacent a second one of said plurality of planks, the first horizontal section of said first one of said plurality of planks overlaps at least a portion of the second horizontal section of said adjacent second one of said plurality of planks;
        wherein the catwalk is formed of said plurality of planks such that the catwalk has a curvature adapted to correspond to the curved sidewall, said curvature of the catwalk being defined by an amount of overlap of adjacent planks of said plurality of planks;
        wherein said each plank of said plurality of planks further has a third generally vertical section extending perpendicularly from said second side of said second horizontal section of said each plank respectively, said third section defining an inner end and an outer end of said each plank and having a lip at each of said respective inner and outer ends; and
    a first set of toe boards and a second set of toe boards, wherein each toe board of said first set of toe boards is respectively secured to the lip at the distal end of at least one of said plurality of planks, wherein said second set of toe boards is respectively adapted to be secured to the lip at the proximal end of said at least one of said plurality of planks, wherein each toe board of the first and second sets of toe boards has spaced sets of openings formed therein, and each of the lips of the third section of said at least one of said plurality of planks has openings corresponding to said openings in said toe boards for securement using fasteners.

2. The catwalk of claim 1 in which the second horizontal section of said second one of said plurality of planks has at least a pair of spaced openings and the first horizontal section of said first one of said plurality of planks has a series of spaced openings configured to be generally in register with said spaced openings of the second horizontal section of the adjacent second plank when the catwalk is formed to allow said first one and said second one of said plurality of planks to have a desired overlap and to have a desired angle with respect to one another so as to receive one or more fasteners for securing together.

3. A catwalk adapted to extend generally horizontally from an interior or exterior of a curved sidewall of a building, said catwalk comprising:
    a plurality of one-piece planks configured to extend generally radially with respect to said sidewall and configured to be adjacent one another when secured to said sidewall; each plank of said plurality of one-piece planks, when installed on said sidewall, having a proximal end and a distal end relative to said building, said proximal end being proximate to and said distal end being proximate to and remote from said building, respectively when said each plank of said catwalk is mounted to the building, wherein said each plank of said plurality of planks further comprises a first generally horizontal section and a second generally horizontal section,
        wherein said first horizontal section of said each plank has a first end and a second end and a first side and a second side, and the second horizontal section of said each plank has a first end and a second end and a first side and a second side;
        wherein said second horizontal section of said each plank extending from the second side of said first horizontal section of said each plank respectively such that said first side of said first horizontal section defines a first side of said each plank and such that said second side of said second horizontal section defines a second side of said each plank;
        wherein when said plurality of planks is arranged such that a first one of said plurality of planks is adjacent a second one of said plurality of planks, the first horizontal section of said first one of said plurality of planks overlaps at least a portion of the second horizontal section of said adjacent second one of said plurality of planks;
        wherein the catwalk is formed of said planks such that the catwalk has a curvature adapted to correspond to the curved sidewall, said curvature of the catwalk being defined by an amount of overlap of adjacent planks of said plurality of planks;
        wherein said each plank of said plurality of planks further has a third generally vertical section extending perpendicularly from said second side of said second horizontal section of said each plank respectively, said third section defining an inner end and an outer end of said each plank and having a lip at each of said respective inner and outer ends; and
    a first toe board adapted to be secured to the distal end of said each plank;
        wherein, the second horizontal section of said second one of said plurality of planks has at least a pair of spaced openings and the first horizontal section of said first one of said plurality of planks has a series of spaced openings configured to be generally in register with said spaced openings of the second horizontal section of the adjacent second plank when catwalk is formed to allow said first one and said second one of said plurality of planks to have a desired overlap and to have a desired angle with respect to one another so as to receive one or more fasteners for securing together;

wherein said spaced openings in said first and second horizontal sections of said first one and said second one of said plurality of planks are slots, the slots in said first horizontal section of said first one of said plurality of planks being angled relative to the slots of the second horizontal section of said second one of said plurality of planks, such that upon assembling said first one and said second one of said plurality of planks in a side-by-side relation, the first horizontal section of said first one plank overlaps the second horizontal section of the adjacent said second one plank with the slots of the first horizontal section of the first one plank crossing the slots of the second horizontal section of the adjacent said second one plank.

4. The catwalk of claim 3 in which for each plank of the plurality of planks, one of said distal and proximal ends is wider than the other of said distal and proximal ends, wherein the distal and proximal ends, respectively, of said each plank define outer and inner ends, respectively, of said each plank when said catwalk is mounted to an exterior sidewall, and wherein the distal and proximal ends, respectively, of said each plank define inner and outer ends, respectively, of said each plank when said catwalk is mounted to an interior sidewall, such that the catwalk formed of said planks has an outer periphery and an inner periphery wherein said outer periphery is greater than said inner periphery.

5. The catwalk of claim 3 wherein the catwalk is adapted to extend from said sidewall of said building of a generally cylindrical shape having a diameter, and wherein an amount of overlap of the first horizontal section of one plank of the plurality of planks with the second horizontal section of an adjacent plank of the plurality of planks is a function of the diameter of the sidewall to which the catwalk is to be installed.

6. The catwalk of claim 3 wherein the slots of one of the first and second horizontal sections of said first and second one planks of the plurality of planks extend generally perpendicular to a longitudinal axis.

7. The catwalk of claim 3 wherein the second horizontal section is vertically offset from, but generally parallel to the first horizontal section of said each plank of the plurality of planks.

8. The catwalk of claim 7 wherein the second horizontal section is spaced below the first horizontal section of said each plank of the plurality of planks by a distance approximately equal to a thickness of the first horizontal section of said each plank of the plurality of planks, such that the first horizontal sections of adjacent planks of the plurality of planks of the catwalk are generally coplanar.

9. The catwalk of claim 3 wherein each plank of the plurality of planks is a one-piece member formed of sheet metal.

\* \* \* \* \*